US012661726B2

(12) United States Patent
Arumugam et al.

(10) Patent No.: US 12,661,726 B2
(45) Date of Patent: Jun. 23, 2026

(54) QUICK CLAMPING MILLING TOOL CUTTERS AND METHODS

(71) Applicant: Kennametal India Limited, Bangalore (IN)

(72) Inventors: Bharath Arumugam, Bangalore (IN); Padmakumar Muthuswamy, Bangalore (IN); Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 742 days.

(21) Appl. No.: 18/155,651

(22) Filed: Jan. 17, 2023

(65) Prior Publication Data

US 2023/0226624 A1 Jul. 20, 2023

(51) Int. Cl.
B23C 5/22 (2006.01)

(52) U.S. Cl.
CPC .......... B23C 5/2243 (2013.01); B23C 5/2208 (2013.01); B23C 2210/165 (2013.01)

(58) Field of Classification Search
CPC .............. B23C 5/2295; B23C 2270/08; B23C 2210/16; B23C 5/2204; B23C 5/2208; B23C 5/2213; B23C 5/2234; B23C 5/2239; B23C 2200/086
See application file for complete search history.

(56) References Cited

U.S. PATENT DOCUMENTS

| | | | | |
|---|---|---|---|---|
| 3,300,834 | A | * | 1/1967 | Stone .................... B23C 5/2295 |
| | | | | 408/233 |
| 4,522,538 | A | * | 6/1985 | Lindsay ................. B23C 5/226 |
| | | | | 407/35 |
| 7,600,951 | B2 | * | 10/2009 | Van Horssen ........... B23C 5/06 |
| | | | | 407/93 |

(Continued)

FOREIGN PATENT DOCUMENTS

| | | | | | |
|---|---|---|---|---|---|
| FR | | 2464115 | A1 | * | 3/1981 ........... B23C 5/2213 |
| WO | WO-2014025187 | | A1 | * | 2/2014 ........... B23C 5/2208 |
| WO | WO20178693 | | A1 | | 9/2020 |

OTHER PUBLICATIONS

English translation of FR 2464115 (Year: 1981).*

(Continued)

*Primary Examiner* — Alan Snyder
(74) *Attorney, Agent, or Firm* — Christopher J. Owens

(57) ABSTRACT

A milling tool cutter includes a tool body, a plurality of cutting inserts, a plurality of clamping studs, a clamping ring, and a detachable fastening member. The tool body has a plurality of pockets disposed circumferentially around the tool body. Each of the cutting inserts is disposed in one of the respective pockets. Each of the clamping studs is attached to one of the respective cutting inserts. The clamping ring is disposed within the tool body. The clamping ring includes a face surface, a seating surface, and a circumferential outer surface extending between the face surface and the seating surface. The seating surface sits against the plurality of clamping studs. The detachable fastening mem- (Continued)

ber is disposed in an attached state fixedly attaching the clamping ring to the tool body causing the clamping studs and their respective cutting inserts to be fixedly attached to the tool body.

20 Claims, 9 Drawing Sheets

(56)                References Cited

U.S. PATENT DOCUMENTS

| | | | |
|---|---|---|---|
| 2007/0189862 A1* | 8/2007 | Viol | ................... B23B 27/1666 |
| | | | 407/113 |
| 2012/0257940 A1 | 10/2012 | Gowda et al. | |
| 2012/0263547 A1 | 10/2012 | Hobohm | |
| 2016/0250696 A1 | 9/2016 | Morrison et al. | |

OTHER PUBLICATIONS

Padmakumar et al., "Flexible clamping element for quick clamping indexable milling cutter", Kennametal dated Dec. 5, 2021, 7 Pgs.
Padmakumar et al., "Quick clamping indexable milling cutter", Kennametal dated Sep. 20, 2021, 6 pgs.

* cited by examiner

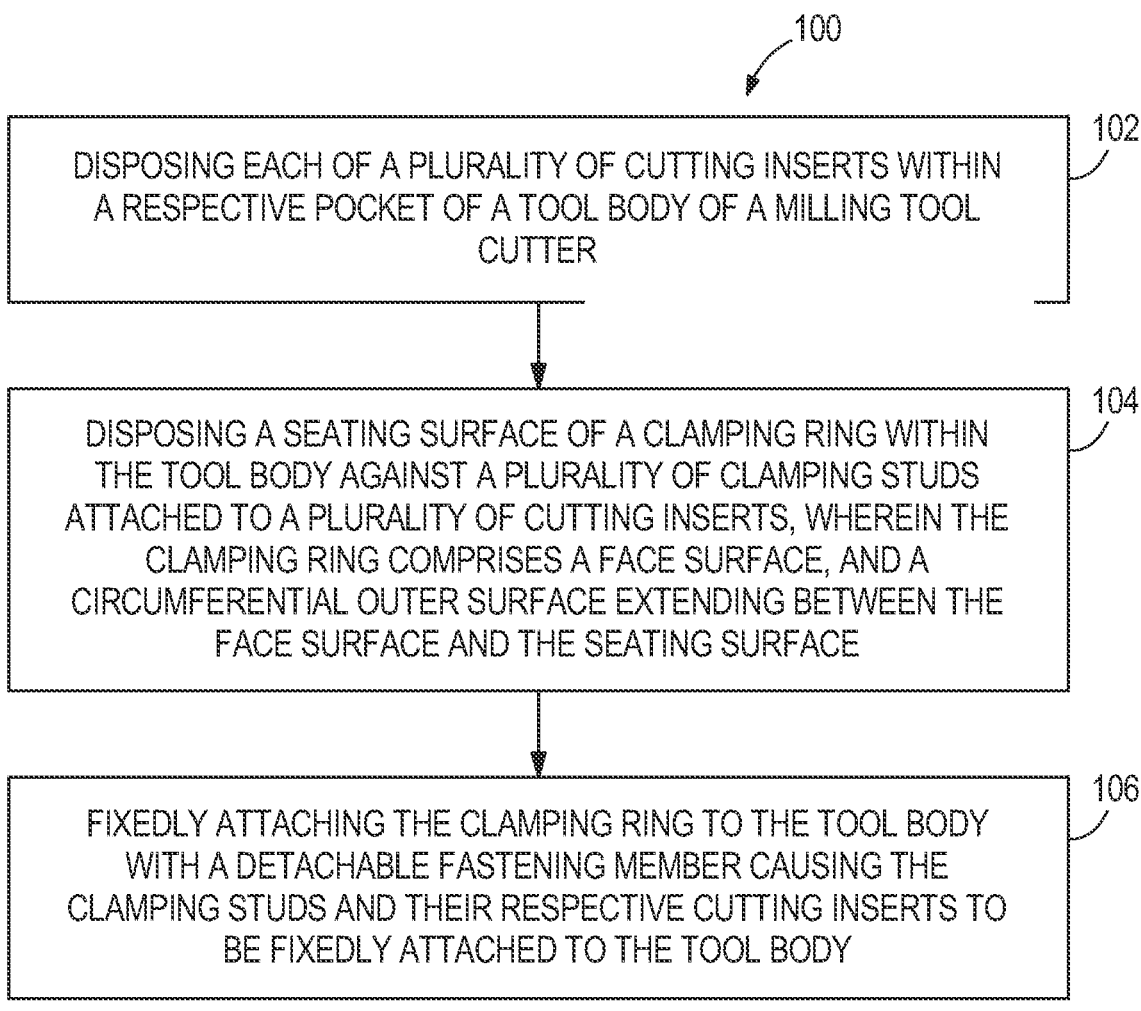

100

DISPOSING EACH OF A PLURALITY OF CUTTING INSERTS WITHIN A RESPECTIVE POCKET OF A TOOL BODY OF A MILLING TOOL CUTTER

102

DISPOSING A SEATING SURFACE OF A CLAMPING RING WITHIN THE TOOL BODY AGAINST A PLURALITY OF CLAMPING STUDS ATTACHED TO A PLURALITY OF CUTTING INSERTS, WHEREIN THE CLAMPING RING COMPRISES A FACE SURFACE, AND A CIRCUMFERENTIAL OUTER SURFACE EXTENDING BETWEEN THE FACE SURFACE AND THE SEATING SURFACE

104

FIXEDLY ATTACHING THE CLAMPING RING TO THE TOOL BODY WITH A DETACHABLE FASTENING MEMBER CAUSING THE CLAMPING STUDS AND THEIR RESPECTIVE CUTTING INSERTS TO BE FIXEDLY ATTACHED TO THE TOOL BODY

QUICK CLAMPING MILLING TOOL CUTTERS AND METHODS

CROSS-REFERENCE To RELATED APPLICATION

This application claims the priority of India provisional application Serial No. 202241003072, filed on Jan. 19, 2022, the contents of which are incorporated herein in its entirety.

FIELD OF THE DISCLOSURE

The disclosure relates to milling tool cutters and to methods of their use.

BACKGROUND

Milling tool cutters typically utilize fasteners to attach cutting inserts within pockets of the milling tool cutters. Each cutting insert has to be separately attached to its respective pocket by attaching fasteners to attach the cutting insert to its pocket. To detach the cutting inserts from the milling tool cutters, each cutting insert has to be separately detached from its respective pocket by detaching the fasteners attaching the cutting insert to its pocket. This can take substantial time and resources which increases cost.

A milling tool cutter and method of its use is needed to overcome one or more issues of one or more of the existing milling tool cutters.

SUMMARY

In one embodiment, a milling tool cutter includes a tool body, a plurality of cutting inserts, a plurality of clamping studs, a clamping ring, and a detachable fastening member. The tool body has a plurality of pockets disposed circumferentially around the tool body. Each of the cutting inserts is disposed in one of the respective pockets. Each of the clamping studs is attached to one of the respective cutting inserts. The clamping ring is disposed within the tool body. The clamping ring includes a face surface, a seating surface, and a circumferential outer surface extending between the face surface and the seating surface. The seating surface sits against the plurality of clamping studs. The detachable fastening member is disposed in an attached state fixedly attaching the clamping ring to the tool body causing clamping studs and their respective cutting inserts to be fixedly attached to the tool body.

In another embodiment, a milling tool cutter includes a tool body, a plurality of cutting inserts, a plurality of clamping studs, a clamping ring, and a detachable fastening member. The tool body has a plurality of pockets disposed circumferentially around the tool body. The plurality of cutting inserts each has a passage. Each of the cutting inserts is disposed in one of the respective pockets. Each of the clamping studs extends through the passage of one of the respective cutting inserts. The clamping ring is disposed within the tool body. The clamping ring is disposed against the plurality of clamping studs. The detachable fastening member is in an attached state fixedly attaching the clamping ring to the tool body causing the clamping studs and their respective cutting inserts to be fixedly attached to the tool body.

In still another embodiment, a method of attaching a plurality of cutting inserts to a tool body of a milling tool cutter is disclosed. In one step, each of a plurality of cutting inserts is disposed within a respective pocket of the tool body of the milling tool cutter. In another step, a seating surface of a clamping ring is disposed within the tool body against a plurality of clamping studs attached to the plurality of cutting inserts. The clamping ring includes a face surface, and a circumferential outer surface extending between the face surface and the seating surface. In yet another step, the clamping ring is fixedly attached to the tool body with a detachable fastening member to cause the clamping studs and their respective cutting inserts to be fixedly attached to the tool body.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 11 is a flowchart illustrating one embodiment of a method of attaching a plurality of cutting inserts to a tool body of a milling tool cutter.

DETAILED DESCRIPTION

Figure 1:
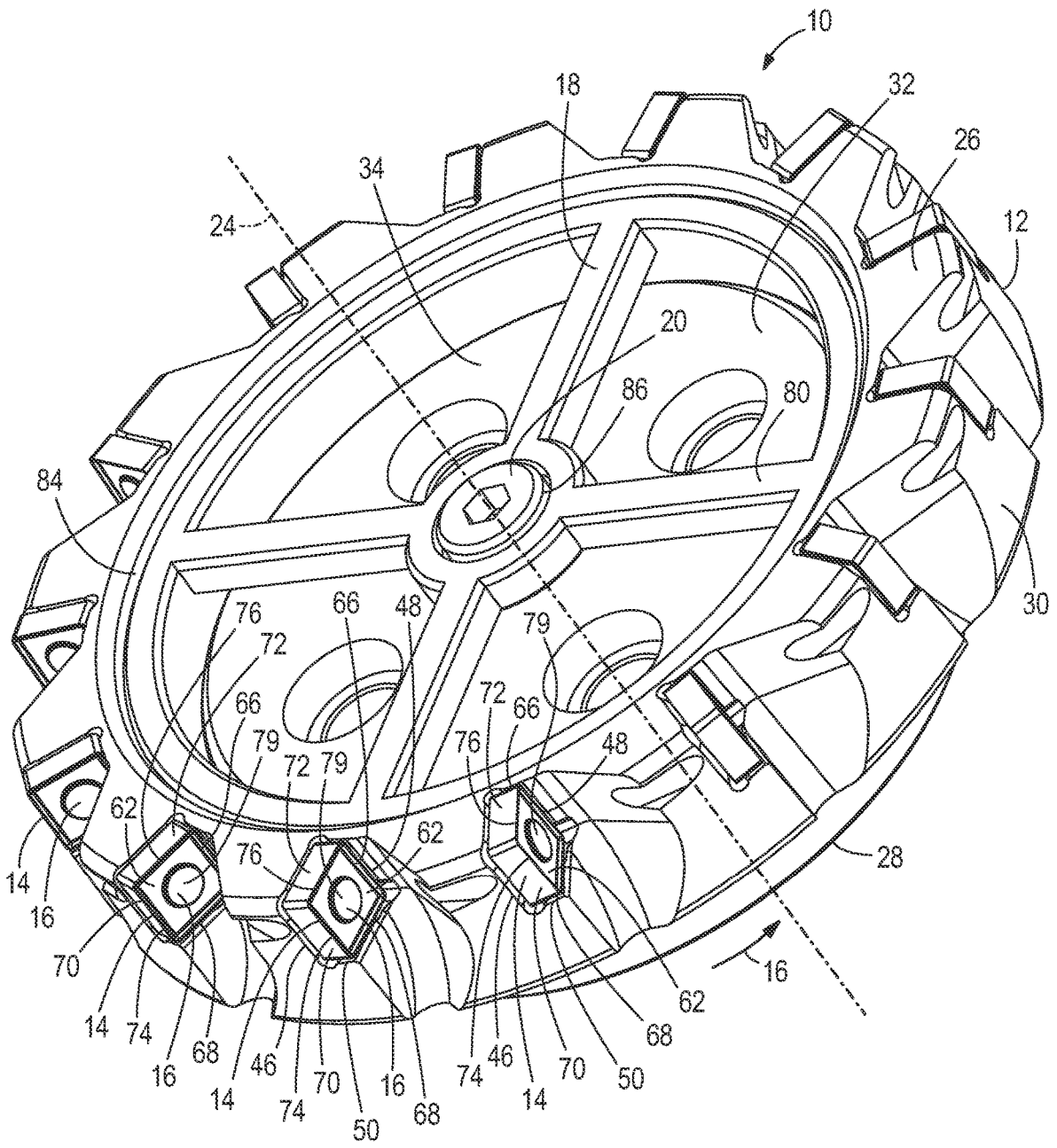
FIG. 1 illustrates one embodiment of a top perspective view of a milling tool cutter having a detachable fastening member in an attached state fixedly attaching a clamping ring to a tool body causing clamping studs and their respective cutting inserts to be fixedly attached to the tool body.
Figure 2:
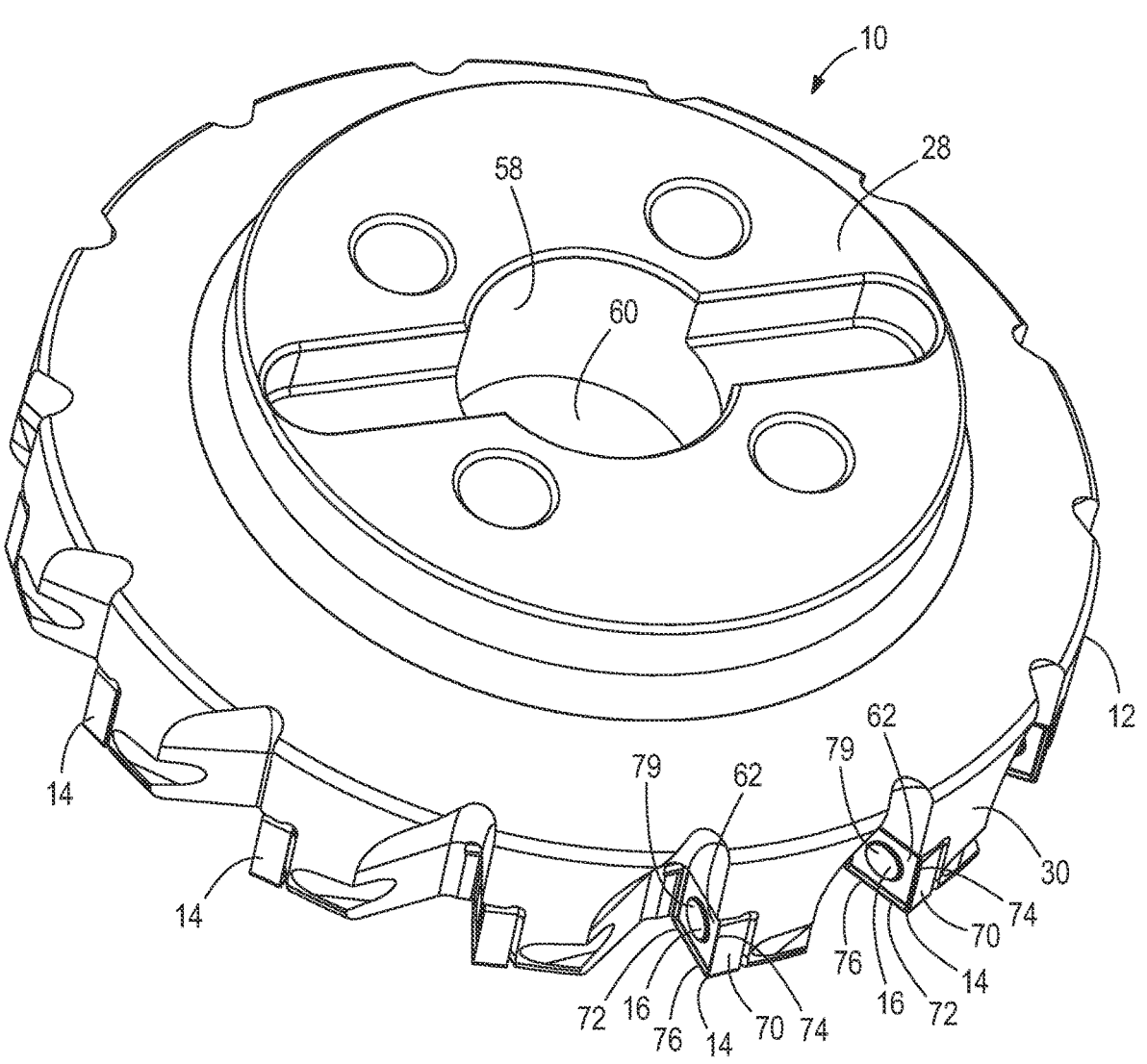
FIG. 2 illustrates a bottom perspective view of the milling tool cutter of FIG. 1.
Figure 3:
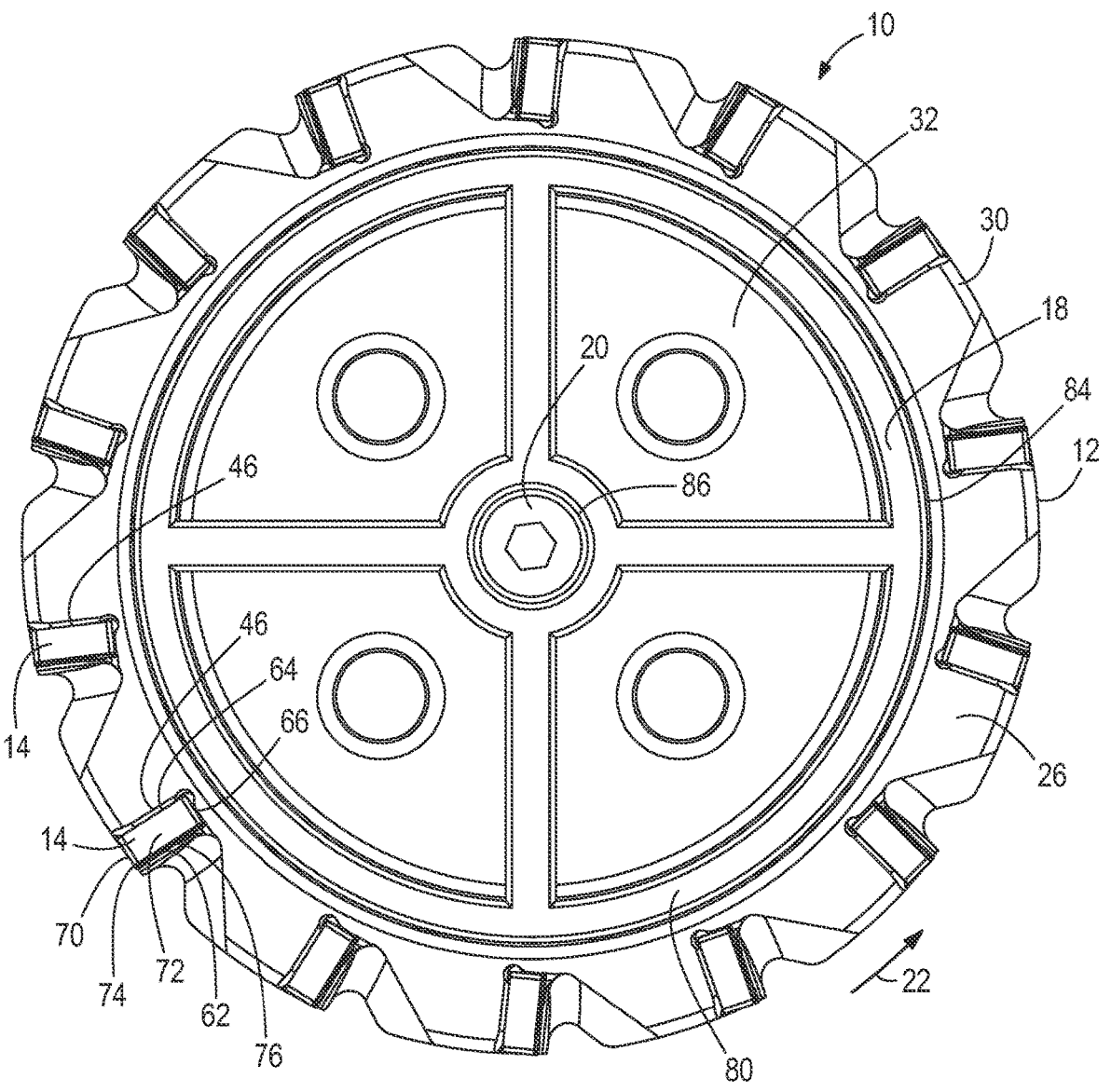
FIG. 3 illustrates a bottom view of the milling tool cutter of FIG. 1.

As illustrated in FIGS. 1-7 collectively, a milling tool cutter 10 is disclosed. The milling tool cutter 10 may comprise an indexable milling tool. The milling tool cutter 10 comprises a tool body 12, a plurality of cutting inserts 14, a plurality of clamping studs 16, a clamping ring 18, and a detachable fastening member 20. The tool body 12 is configured to be rotated in counter-clockwise direction 22 around axis 24 by an attached motor (not shown) in order to cut a workpiece with the plurality of cutting inserts 14.

The tool body 12 comprises opposed top and bottom surfaces 26 and 28. A circumferential outer surface 30 extends transversely between the top and bottom surfaces 26 and 28. An intermediate circumferential surface 32 is disposed below the top surface 26 and above the bottom surface 28 forming an inner cavity 34 within the tool body 12. The intermediate circumferential surface 32 is disposed parallel to the opposed top and bottom surfaces 26 and 28. An inner circumferential trench 36 is formed within the inner cavity 34. The inner circumferential trench 36 comprises a floor surface 38 extending between walls 40 and 42. Floor surface 38 is disposed, in parallel alignment, below the intermediate circumferential surface 32 and above the bottom surface 28. Wall 40 extends from the floor surface 38 to the top surface 26. Wall 42 extends from the floor surface 38 to the intermediate circumferential surface 32. Walls 40 and 42 are disposed in parallel alignment to outer circumferential surface 30 and to intermediate circumferential surface 32.

A plurality of pockets 44 are defined within the circumferential outer surface 30 circumferentially around the tool body 12 in spaced-apart formation. The pockets 44 are open at the top surface 26 of the tool body 12. Each pocket 44 comprises an insert seating surface 46 and first and second side surfaces 48 and 50 disposed transversely to the insert seating surface 46. The insert seating surface 46 is disposed transversely to the circumferential outer surface 30. First side surface 48 is disposed in parallel alignment to outer and inner circumferential surfaces 30 and 40. Second side surface 50 is disposed in parallel alignment to top and bottom surfaces 26 and 28. Each of the pockets 44 comprises a channel 52. A plurality of holes 54, disposed in the floor surface 38 of the inner circumferential trench 36, are aligned with the respective channels 52. The channel 52 of each pocket 44 extends from the insert seating surface 46, through the inner circumferential surface 40, and ends in a respective hole 54 disposed in the floor surface 38 of the inner circumferential trench 36.

An open shaft 56 extends through the intermediate circumferential surface 32 into a second open shaft 58. The open shaft 56 is threaded. The second open shaft 58 is disposed between the bottom surface 28 and an open shaft upper surface 60 which is disposed below the intermediate circumferential surface 32. The second open shaft 58 is threaded. The open shaft upper surface 60 is disposed in parallel alignment to the intermediate circumferential surface 32. A threaded rod (not shown) attached to a motor (not shown) may be fixedly attached within and to the second open shaft 58 so that the tool body 12 rotates with the rod (not shown) in counter-clockwise direction 22 around axis 24.

Each cutting insert 14 comprise a rake face 62, a seating face 64, first, second, third, and fourth flank faces 66, 68, 70, and 72 extending between the rake face 62 and seating face 64, first and second cutting edges 74 and 76, and a passage 77. The rake face 62 and seating face 64 are opposed to one another. The first and third flank faces 66 and 70 are opposed to one another. Similarly, the second and fourth flank faces 68 and 72 are opposed to one another. The first cutting edge 74 comprises the intersection of the rake face 62 and the third flank face 70. The second cutting edge 76 comprises the intersection of the rake face 62 and the fourth flank face 72. The passage 77 of each cutting insert 14 extends from the rake face 62, through the cutting insert 14, to the seating face 64.

Each of the plurality of cutting inserts 14 is disposed in a respective pocket 44. The seating face 64 of each cutting insert 14 is disposed against the respective insert seating surface 46 of the pocket 44 which it is disposed in. The first flank face 66 of each cutting insert 14 is disposed against the respective first side surface 48 of the pocket 44 which it is disposed in. The second flank face 68 of each cutting insert 14 is disposed against the respective second side surface 50 of the pocket 44 which it is disposed in. The third flank face 70 of each cutting insert 14 freely sits in the open adjacent the circumferential outer surface 30 of the tool body 12. The fourth flank face 72 of each cutting insert 14 freely sits in the open adjacent the top surface 26 of the tool body 12. The rake face 62 of each cutting inset 14 sits freely in the open in the respective pocket 44 which it is disposed in.

The plurality of clamping studs 16 are each attached to one of the respective cutting inserts 14. Each of the clamping studs 16 comprises a larger portion 79 and a smaller portion 81. The larger portion 79 is disposed at angle 75 relative to the smaller portion 81. Angle 75 is 137.5°. In other embodiments, the angle 75 may range from 127.5° to 147.5°. In still other embodiments, the angle 75 may further vary. The smaller portion 81 comprises a shaft and the larger portion 79 comprises a head disposed at an end of the shaft. In other embodiments, the larger and smaller portions 79 and 81 may vary. Each of the larger portions 79 of the clamping studs 16 are larger than the passage 77 in its respective cutting insert 14 and abut against the rake face 62 of the cutting insert 14 preventing the larger portion 79 from passing through the passage 77. Each of the smaller portions 81 of the clamping studs 16 are smaller than the passage 77 in its respective cutting insert 14. Each of the smaller portions 81 of the clamping studs 16 extend through the passage 77 from the rake face 62 and out of the seating face 64 of the respective cutting insert 14, through the channel 52 from the insert seating surface 46 of the respective pocket 44 and out of the inner circumferential surface 40 of the tool body 12, through the circumferential trench 36, and into the respective hole 54 disposed in the floor surface 38 of the inner circumferential trench 36. An end 78 of each of the clamping studs 16 is disposed in one of the respective holes 54 disposed in the floor surface 38 of the inner circumferential trench 36.

The clamping ring 18 comprises a face surface 80, a seating surface 82, a circumferential outer surface 84, and a hole 86. The circumferential outer surface 84 extends transversely between the face surface 80 and the seating surface 82. The hole 86 extends from the face surface 80 to the seating surface 82. The clamping ring 18 is disposed within the tool body 12. The circumferential outer surface 84 of the clamping ring 18 is disposed adjacent the inner circumferential surface 40 of the tool body 12. The seating surface 82 sits against the plurality of clamping studs 16. The seating surface 82 is disposed in the inner circumferential trench 36 within and against a groove 88 of each respective clamping stud 16.

The detachable fastening member 20 comprises a threaded bolt. In other embodiments, the detachable fastening member 20 may vary. In the attached state, as shown by FIGS. 1-3 and 7, the detachable fastening member 20 passes through the hole 86 in the clamping ring 18 into the open shaft 56 of the tool body 12 fixedly attaching the clamping ring 18 to the tool body 12. This causes the clamping studs 16 and their respective cutting inserts 14 to be fixedly attached to the tool body 12 due to the seating surface 82 of the clamping ring 18 being disposed in the inner circumferential trench 36 within and against the groove 88 of each respective clamping stud 16 providing a downward force 90 on the groove 88. In such manner, the seating surface 82 of the clamping ring 18 sits against the plurality of clamping studs 16. The downward force 90 on the respective grooves 88 prevents the smaller portions 81 of the clamping studs 16 from moving out of the holes 54, the inner circumferential trench 36, the channel 52, and the passage 77, thereby locking them in place.

Figure 4:
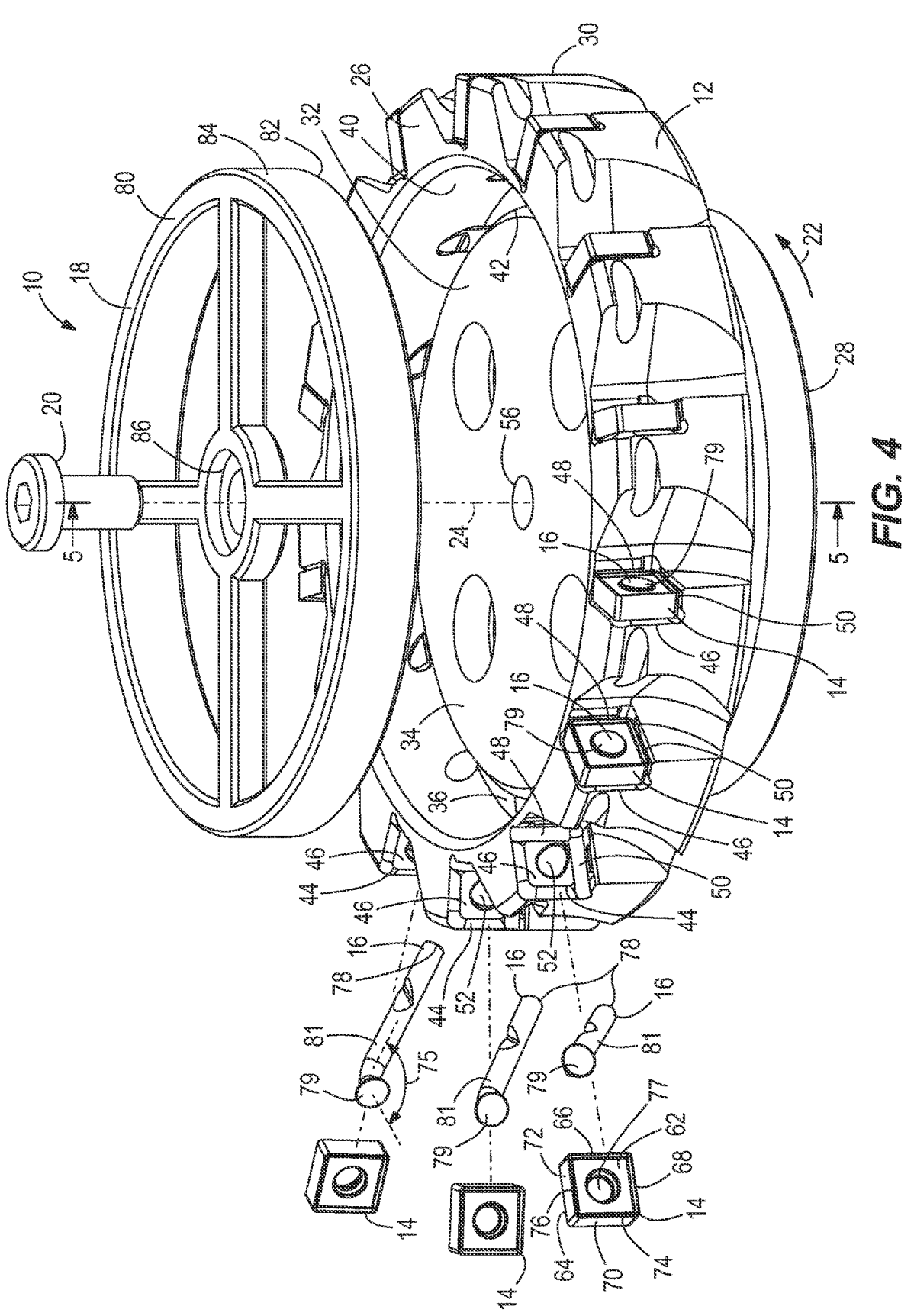
FIG. 4 illustrates the top perspective view of the milling tool cutter of FIG. 1 with the detachable fastening member in a detached state detached from the clamping ring and the tool body, the detachable fastening member and the clamping ring separated from the tool body, and the cutting inserts and their respective clamping studs detachable from the tool body with three of the cutting inserts and their respective clamping studs having been separated from the tool body.
Figure 5:
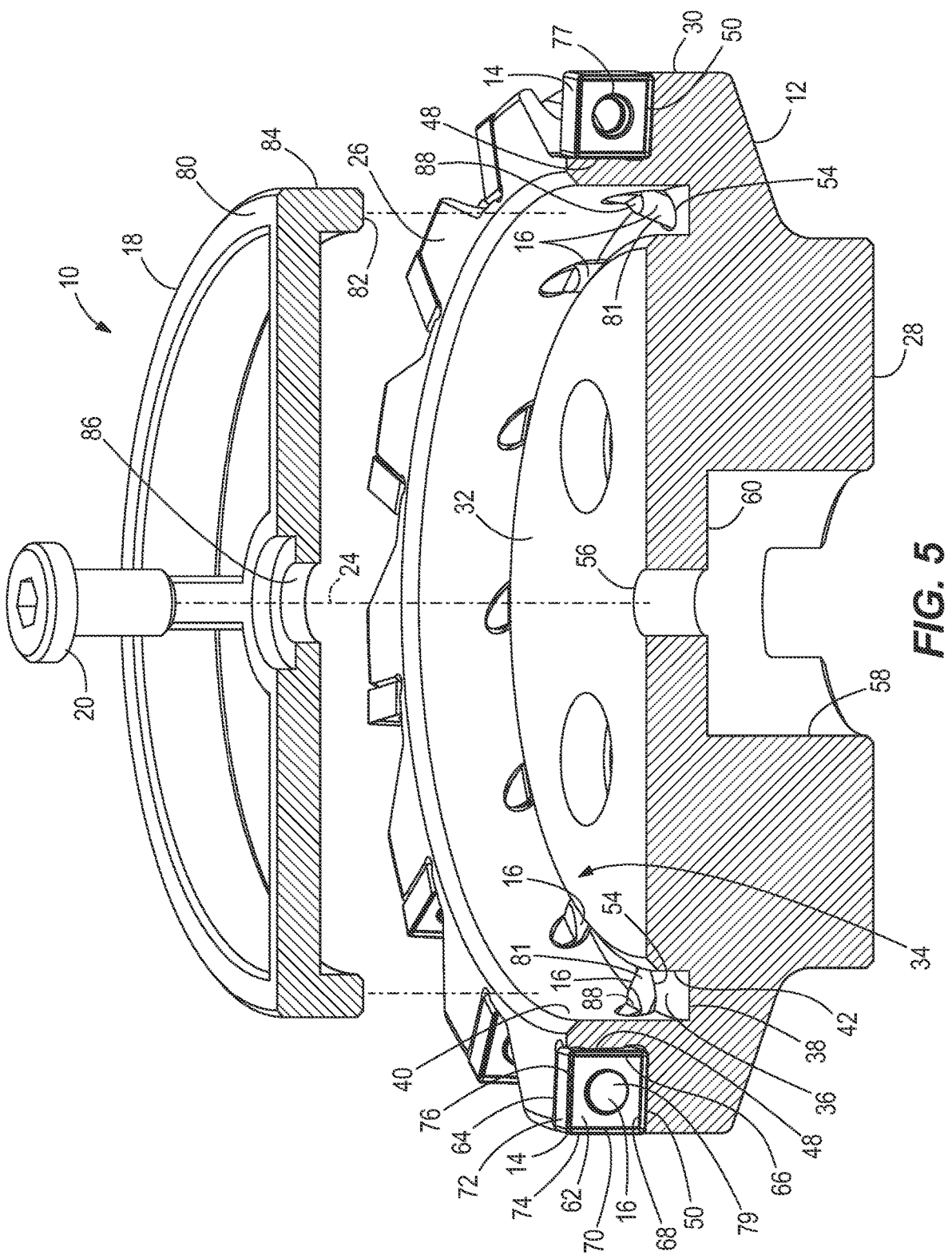
FIG. 5 illustrates a cross-sectional view along line 5-5 of the embodiment of FIG. 4.
Figures 6, 7:
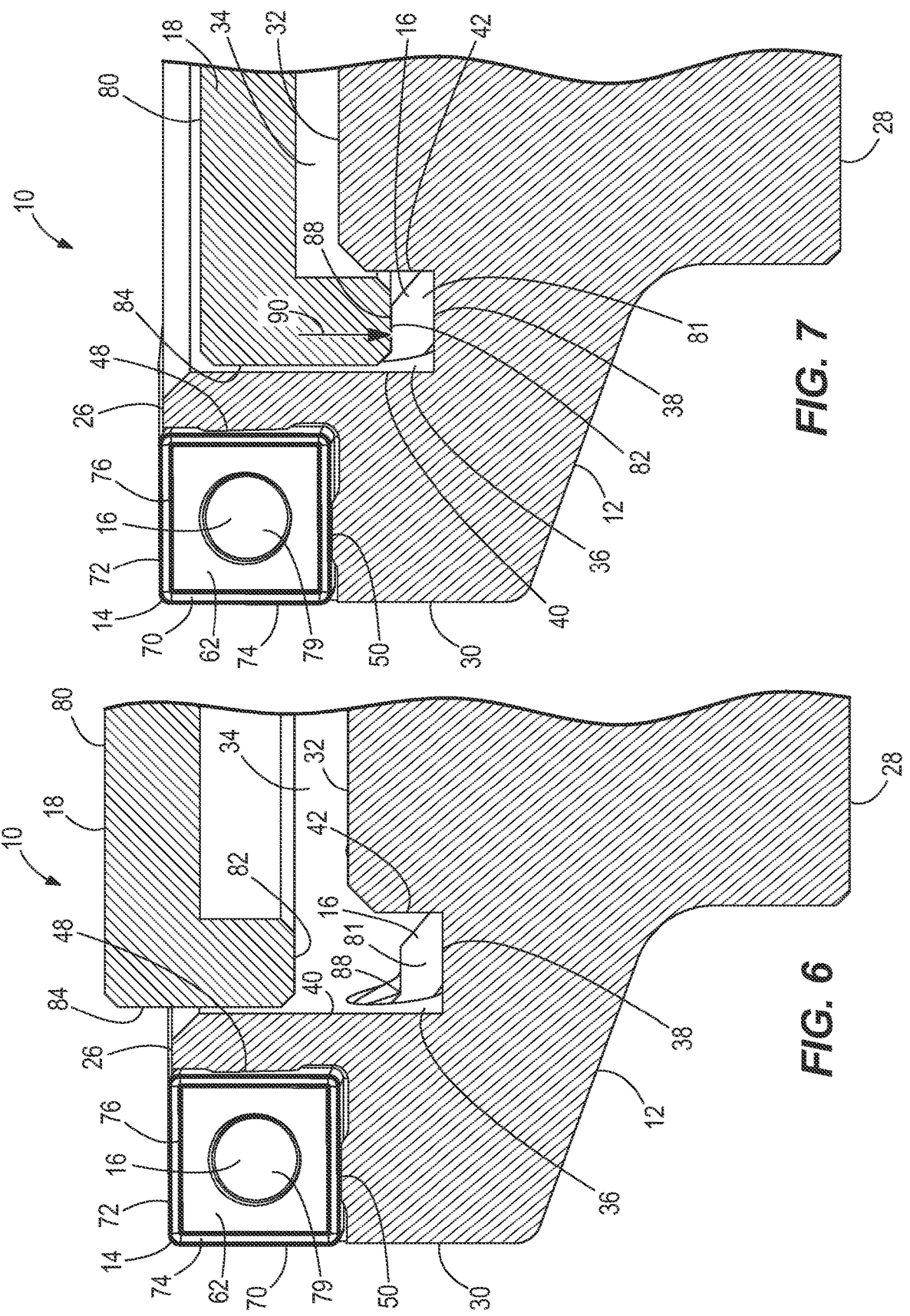
FIG. 6 illustrates a partial cross-sectional view of the milling tool cutter of FIG. 1 with the detachable fastening member in a detached state detached from the clamping ring and the tool body, the clamping ring disposed within the tool body with a seating surface of the clamping ring separated from an inner circumferential trench of the tool body and from a groove of each clamping stud disposed within the inner circumferential trench, and the cutting inserts and their respective clamping studs detachable from the tool body.
FIG. 7 illustrates a partial cross-sectional view of the milling tool cutter of FIG. 1 with the detachable fastening member in an attached state attaching the clamping ring to the tool body, a seating surface of the clamping ring disposed in an inner circumferential trench of the tool body within and against a groove of each clamping stud thereby fixedly attaching the clamping studs and their respective attached clamping inserts to the tool body.

When the detachable fastening member 20 is in the detached state, as shown by FIGS. 4-6, the detachable fastening member 20 is detached from the hole 86 of the clamping ring 18 and the open shaft 56 of the tool body 12, causing the clamping ring 18, the plurality of clamping studs 16, and their respective cutting inserts 14 to be detachable from the tool body 12. The clamping ring 18 can then be separated from the tool body 12 causing the seating surface 82 of the clamping ring 18 to be separated from the inner circumferential trench 36 of the tool body 12 and removed from the groove 88 of each respective clamping stud 16. This removes the downward force 90, formerly provided by the seating surface 82 of the clamping ring 18 on the respective grooves 88 of each clamping stud 16, thereby causing the clamping studs 16 and their respective cutting inserts 14 to be detachable from the tool body 12. At this time, the smaller portions 81 of the clamping studs 16 may be moved out of the holes 54, the inner circumferential trench 36, the channel 52, and the passage 77 to separate the clamping studs 16 from the cutting inserts 14 and the tool body 12. The cutting inserts 14 can then be removed from the respective pockets 44 of the tool body 12.

In such manner, depending on the state of the detachable fastening member 20 relative to the clamping ring 18 and the tool body 12, the cutting inserts 14 and their respective attached clamping studs 16 can be simultaneously attached to the tool body 12 or simultaneously detachable from the tool body 12.

Figure 8:
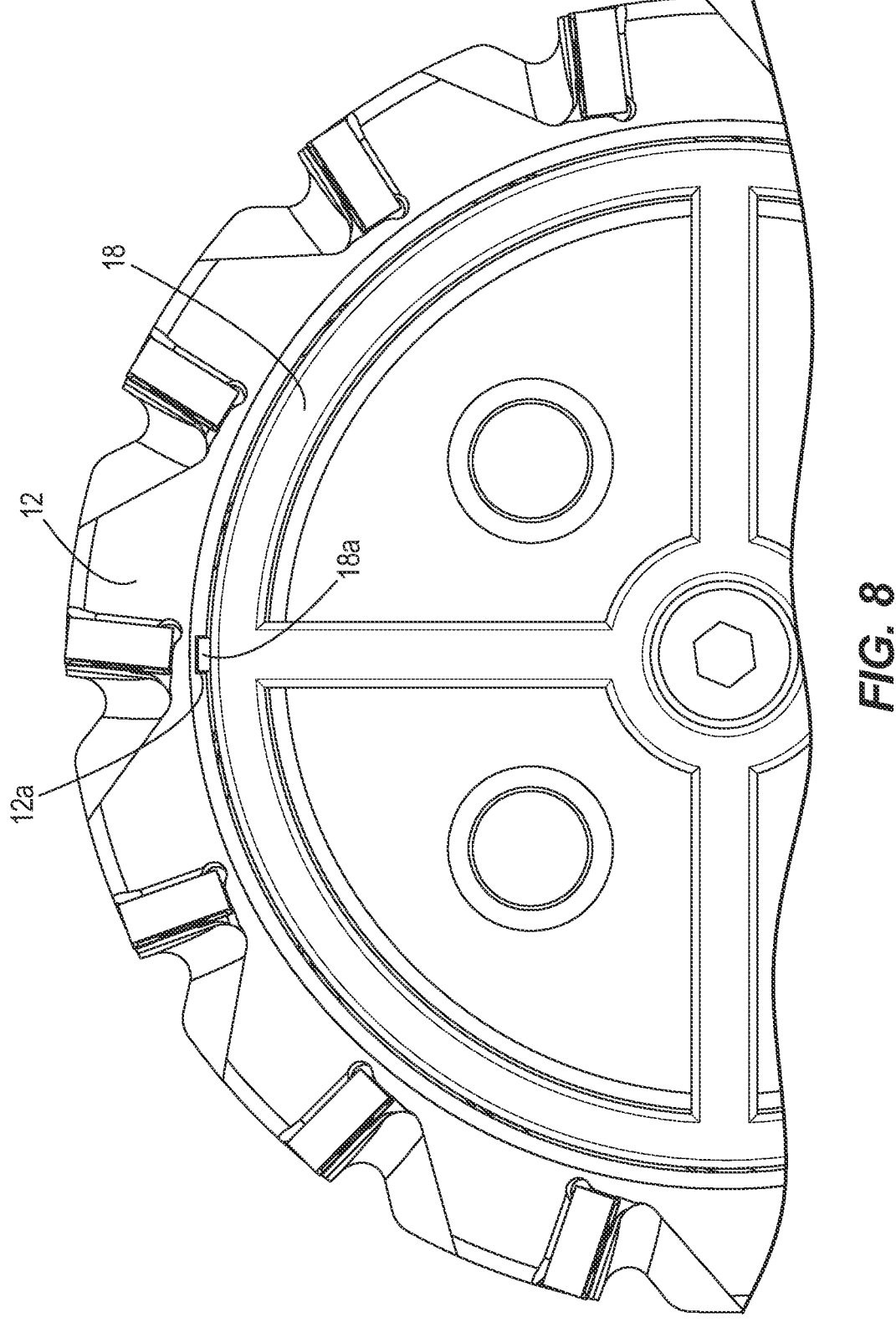
FIG. 8 illustrates a partial top view of another embodiment of the milling tool cutter of FIG. 1 with alignment members of the tool body and clamping ring mated and aligned to orient the clamping ring in a particular position within the tool body.
Figures 9, 10:
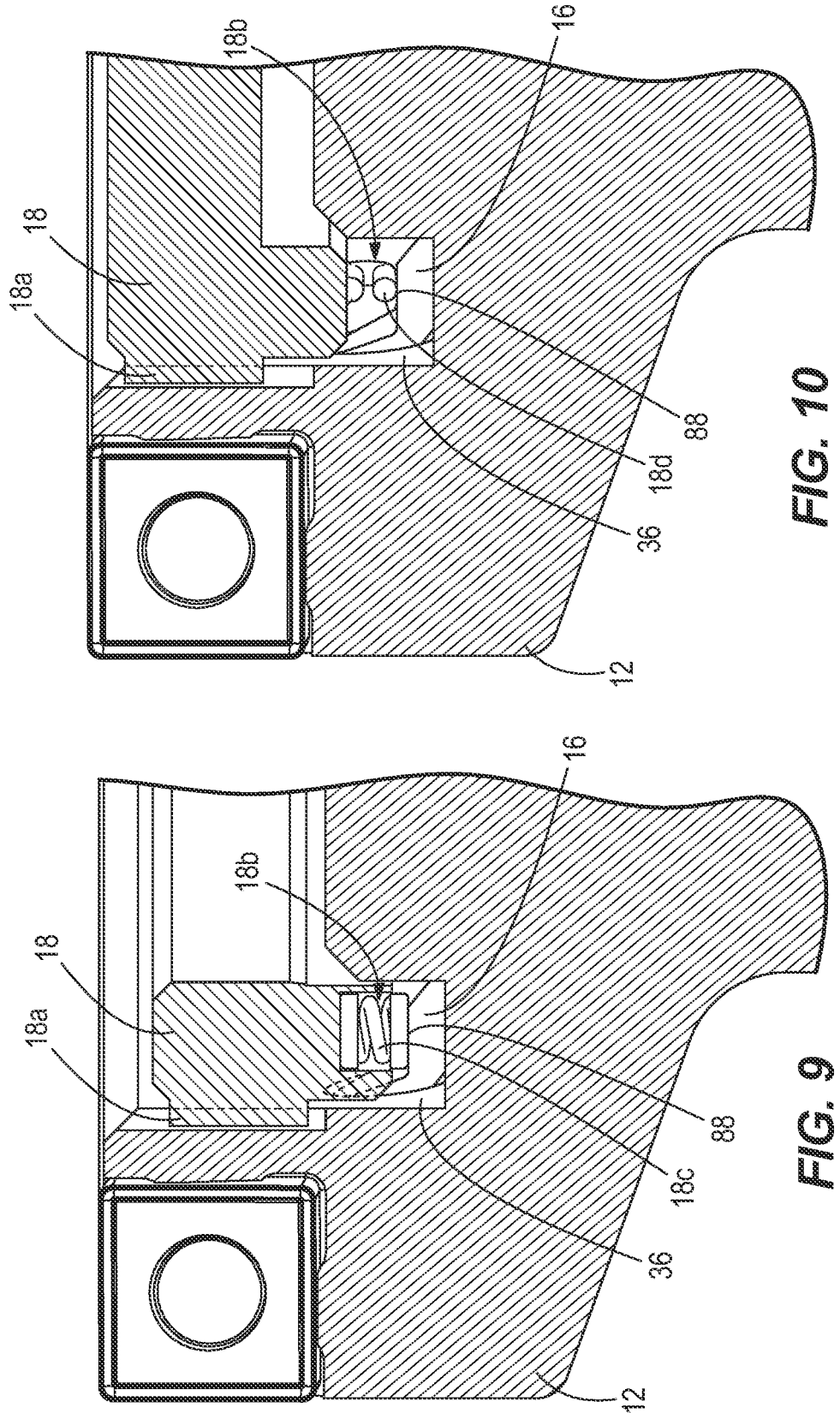
FIG. 9 illustrates a partial cross-sectional view of the milling tool cutter of FIG. 8 with the detachable fastening member in an attached state attaching the clamping ring to the tool body, a seating surface of the clamping ring disposed in an inner circumferential trench of the tool body, and a flexible member, comprising a spring, attached to the clamping ring and disposed in and against a groove of a respective clamping stud.
FIG. 10 illustrates a partial cross-sectional view of the milling tool cutter of FIG. 8 with the detachable fastening member in an attached state attaching the clamping ring to the tool body, a seating surface of the clamping ring disposed in an inner circumferential trench of the tool body, and a flexible member, comprising a clip, attached to the clamping ring and disposed in and against a groove of a respective clamping stud.

As illustrated in FIGS. 8-10 collectively, in another embodiment the tool body 12 and clamping ring 18 of the milling tool cutter 10 may comprise alignment members 12a and 18a which are configured to mate to align and orient the clamping ring 18 in a particular position within the tool body 12. Alignment member 12a may comprise a slot, and alignment member 18a may comprise a tab. Alignment member 18a is sized to fit within alignment member 12a. In other embodiments, alignment members 12a and 18a may vary in type, size, orientation, configuration, or number. Clamping ring 18 may further comprise a plurality of flexible members 18b attached to and spaced around the seating surface 82. Each respective flexible member 18b may comprise a spring 18c, a clip 18d, or another type of flexible member. Each flexible member 18b is configured to be disposed in and against a respective groove 88 of a respective clamping stud 16 when the alignment members 12a and 18a are aligned and the seating surface 82 is disposed in the inner circumferential trench 36. The flexible members 18b ensure equal distribution of the clamping force provided by the clamping ring 18 to the clamping studs 16 regardless of deviation in manufacturing tolerances of the clamping studs 14. This prevents cutting inserts 14 in some pockets 44 from receiving higher clamping force than other cutting inserts 14 in other pockets 44.

In other embodiments, one or more components of the milling tool cutter 10 may be removed, may be modified in quantity, configuration, orientation, size, or type, or one or more additional components may be added. In still other embodiments, the milling tool cutter 10 may be further modified.

FIG. 11 illustrates one embodiment of a method 100 of attaching a plurality of cutting inserts to a tool body of a milling tool cutter. The method 100 may use any of the milling tool cutters embodiments disclosed herein. In other embodiments, the method 100 may utilize varying milling tool cutters. Step 102 comprises disposing each of a plurality of cutting inserts within a respective pocket of the tool body of the milling tool cutter. Step 104 comprises disposing a seating surface of a clamping ring within the tool body against a plurality of clamping studs attached to the plurality of cutting inserts. The clamping ring comprises a face surface, and a circumferential outer surface extending between the face surface and the seating surface. Step 106 comprises fixedly attaching the clamping ring to the tool body with a detachable fastening member causing the clamping studs and their respective cutting inserts to be fixedly attached to the tool body.

An optional step of the method 100 comprises detaching the detachable fastening member from the clamping ring and the tool body thereby causing the clamping ring, the plurality of clamping studs, and their respective cutting inserts to be detachable from the tool body.

Another optional step of the method 100 comprises extending each of the clamping studs through a passage in its respective cutting insert.

Still another optional step of the method 100 comprises a larger portion of each of the clamping studs preventing the larger portion from extending through the passage of its respective cutting insert.

Another optional step of the method 100 comprises extending each of the clamping studs through a channel in its respective pocket.

Still another optional step of the method 100 comprises disposing the seating surface in an inner circumferential trench of the tool body.

Yet another optional step of the method 100 comprises disposing an end of each of the clamping studs to remain within a respective hole of the tool body.

Still another optional step of the method 100 comprises disposing a plurality of flexible members between and against both the clamping ring and the clamping studs.

Yet another optional step of the method 100 comprises mating alignment members of the tool body and the clamping ring to align and orient the clamping ring in a particular position within the tool body.

Still another optional step of the method 100 comprises passing the detachable fastening member through a hole in the clamping ring into an open shaft of the tool body to fixedly attach the clamping ring to the tool body. At this time, the seating surface is disposed within and against a groove of each of the respective clamping studs to provide a downward force on the groove to prevent smaller portions of the clamping studs from moving out of holes of the tool body, an inner circumferential trench of the tool body, a channel of the tool body, and a passage of the respective cutting insert, thereby locking them in place. As a result, the clamping studs and their respective cutting inserts are fixedly attached to the tool body.

Yet another optional step of the method 100 comprises detaching the detachable fastening member from a hole of the clamping ring and an open shaft of the tool body, causing the clamping ring, the plurality of clamping studs, and their respective cutting inserts to be detachable from the tool body. Next, the clamping ring is separated from the tool body causing the seating surface of the clamping ring to be separated from an inner circumferential trench of the tool body and removed from a groove of each respective clamping stud. This removes a downward force, formerly provided by the seating surface of the clamping ring on the respective grooves of each clamping stud, thereby causing the clamping studs and their respective cutting inserts to be detachable from the tool body. Then, smaller portions of the clamping studs may be moved out of holes of the tool body, the inner circumferential trench of the tool body, a channel of the tool body, and a passage of the tool body to separate the clamping studs form the cutting inserts and the tool body. Next, the cutting inserts can be removed from the respective pockets of the tool body.

In other embodiments one or more steps of the method 100 may not be followed, may be modified in substance or in order, and/or one or more additional steps may be added. In still other embodiments, the method 100 may be further modified.

One or more embodiments of the disclosure may reduce one or more issues of one or more of the existing milling tool cutters and methods of their use by providing a quick clamping and quick de-clamping milling tool cutter. This may be achieved with a milling tool cutter 10 utilizing a detachable fastening member 20 to attach a clamping ring 18 to a tool body 12 to simultaneously attach a plurality of clamping studs 16 and their respective attached clamping inserts 14 to the tool body 12. To simultaneously detach the plurality of clamping studs 16 and their respective clamping inserts 14 from the tool body 12, the detachable fastening member 20 is removed from the clamping ring 18 and the tool body 12. This quick clamping and quick de-clamping milling tool cutter 10 avoids having to separately attach and separately detach the clamping inserts 14 to and from the tool body 12 thereby saving substantial time, resources, and cost.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

We claim:

1. A milling tool cutter comprising:
   a tool body having a plurality of pockets disposed circumferentially around the tool body;
   a plurality of cutting inserts, each of the cutting inserts disposed in one of the respective pockets;
   a plurality of clamping studs, each of the clamping studs having a groove;
   a clamping ring disposed within the tool body, the clamping ring comprising a face surface, a seating surface, and a circumferential outer surface extending between the face surface and the seating surface; and
   a detachable fastening member in an attached state fixedly attaching the clamping ring to the tool body, wherein the fastening member causes a downward force by the seating surface of the clamping ring against the groove of the clamping stud causing the respective cutting inserts to be fixedly attached to the tool body.

2. The milling tool cutter of claim 1 wherein when the detachable fastening member is in a detached state detached from the clamping ring and the tool body, the clamping ring, the plurality of clamping studs, and their respective cutting inserts are detachable from the tool body.

3. The milling tool cutter of claim 1 wherein each of the cutting inserts comprises a passage, each of the clamping studs extending through the passage in its respective cutting insert.

4. The milling tool cutter of claim 3 wherein each of the clamping studs comprises a larger portion and a smaller portion, each of the larger portions being larger than the respective passage preventing the larger portion from extending through the respective passage, and each of the smaller portions being smaller than the respective passage and extending through the respective passage.

5. The milling tool cutter of claim 1 wherein each of the pockets comprises a channel, each of the clamping studs extending through its respective channel.

6. The milling tool cutter of claim 1 wherein the tool body comprises an inner circumferential trench, the seating surface disposed in the inner circumferential trench.

7. The milling tool cutter of claim 1 wherein the tool body comprises a plurality of holes, an end of each of the clamping studs disposed in one of the plurality of holes.

8. The milling tool cutter of claim 1 wherein each of the clamping studs comprises a groove, the seating surface seating within and against the respective groove of each of the clamping studs.

9. The milling tool cutter of claim 1 further comprising a plurality of flexible members disposed between and against both the clamping ring and the clamping studs, and/or further comprising alignment members of the tool body and clamping ring being mated thereby aligning and orienting the clamping ring in a particular position within the tool body.

10. A milling tool cutter comprising:
   a tool body having a plurality of pockets disposed circumferentially around the tool body;
   a plurality of cutting inserts each having a passage, each of the cutting inserts disposed in one of the respective pockets;
   a plurality of clamping studs, each of the clamping studs having a groove and extending through the passage of one of the respective cutting inserts;
   a clamping ring disposed within the tool body, the clamping ring disposed against the plurality of clamping studs; and
   a detachable fastening member in an attached state fixedly attaching the clamping ring to the tool body and against a groove of each of the clamping studs causing the clamping studs and their respective cutting inserts to be fixedly attached to the tool body.

11. The milling tool cutter of claim 10 wherein when the detachable fastening member is in a detached state detached from the clamping ring and the tool body, the clamping ring, the plurality of clamping studs, and their respective cutting inserts are detachable from the tool body.

12. The milling tool cutter of claim 10 wherein each of the clamping studs comprises a larger portion and a smaller portion, each of the larger portions being larger than the respective passage preventing the larger portion from extending through the respective passage, and each of the smaller portions being smaller than the respective passage and extending through the respective passage.

13. A method of attaching a plurality of cutting inserts to a tool body of a milling tool cutter comprising:
   disposing each of a plurality of cutting inserts within a respective pocket of the tool body of the milling tool cutter;
   providing a plurality of clamping studs, each of the clamping studs having a groove;
   disposing a seating surface of a clamping ring within the tool body against a groove of each of the plurality of clamping stud, the clamping ring comprising a face surface, and a circumferential outer surface extending between the face surface and the seating surface; and
   fixedly attaching the clamping ring to the tool body with a detachable fastening member to cause a downward force by the clamping ring against the groove of the clamping studs causing the respective cutting inserts to be fixedly attached to the tool body.

14. The method of claim 13 further comprising detaching the detachable fastening member from the clamping ring and the tool body thereby causing the clamping ring, the plurality of clamping studs, and their respective cutting inserts to be detachable from the tool body.

15. The method of claim 13 further comprising extending each of the clamping studs through a passage in its respective cutting insert.

16. The method of claim 15 further comprising a larger portion of each of the clamping studs preventing the larger portion from extending through the passage of its respective cutting insert.

17. The method of claim 13 further comprising extending each of the clamping studs through a channel in its respective pocket.

18. The method of claim 13 further comprising disposing the seating surface in an inner circumferential trench of the tool body.

19. The method of claim 13 further comprising disposing an end of each of the clamping studs to remain within a respective hole of the tool body.

20. The method of claim 13 further comprising disposing the seating surface within and against a groove of each of the respective clamping studs.

* * * * *